(12) United States Patent
Freestone et al.

(10) Patent No.: US 7,886,006 B1
(45) Date of Patent: Feb. 8, 2011

(54) METHOD FOR ANNOUNCING E-MAIL AND CONVERTING E-MAIL TEXT TO VOICE

(75) Inventors: Jerry Freestone, Calgary (CA); Jim Paarsmarkt, Calgary (CA); Brian Buckler, Calgary (CA)

(73) Assignee: Avaya Inc., Basking Ridge, NJ (US)

( * ) Notice: Subject to any disclaimer, the term of this patent is extended or adjusted under 35 U.S.C. 154(b) by 1276 days.

(21) Appl. No.: 09/668,875

(22) Filed: Sep. 25, 2000

(51) Int. Cl.
*G06F 15/16* (2006.01)

(52) U.S. Cl. .................. 709/206; 709/205; 709/207

(58) Field of Classification Search ............. 709/203, 709/204, 206, 207, 205, 231, 246
See application file for complete search history.

(56) References Cited

U.S. PATENT DOCUMENTS

| | | | | |
|---|---|---|---|---|
| 4,996,707 A | * | 2/1991 | O'Malley et al. ...... | 379/100.13 |
| 5,406,557 A | * | 4/1995 | Baudoin ................... | 370/407 |
| 5,621,727 A | * | 4/1997 | Vaudreuil ................. | 370/401 |
| 5,634,084 A | * | 5/1997 | Malsheen et al. ......... | 704/260 |
| 5,647,002 A | * | 7/1997 | Brunson .................. | 709/206 |
| 5,732,216 A | * | 3/1998 | Logan et al. ............. | 709/203 |
| 5,872,779 A | * | 2/1999 | Vaudreuil ................. | 370/352 |
| 5,946,386 A | * | 8/1999 | Rogers et al. ......... | 379/265.09 |
| 6,085,231 A | * | 7/2000 | Agraharam et al. ....... | 709/206 |
| 6,182,041 B1 | | 1/2001 | Li et al. ................... | 704/260 |
| 6,233,318 B1 | * | 5/2001 | Picard et al. ............. | 379/88.17 |
| 6,246,672 B1 | * | 6/2001 | Lumelsky ................ | 370/310 |
| 6,252,588 B1 | * | 6/2001 | Dawson .................. | 345/752 |
| 6,259,444 B1 | * | 7/2001 | Palmer et al. ............. | 715/866 |
| 6,385,306 B1 | * | 5/2002 | Baxter, Jr. ................ | 379/88.13 |
| 6,411,685 B1 | * | 6/2002 | O'Neal ................... | 379/88.14 |
| 6,421,707 B1 | * | 7/2002 | Miller et al. .............. | 709/206 |
| 6,463,134 B1 | * | 10/2002 | Okada et al. ............. | 379/93.24 |
| 6,507,643 B1 | * | 1/2003 | Groner ................... | 379/88.14 |
| 6,563,912 B1 | * | 5/2003 | Dorfman et al. ......... | 379/88.13 |
| 6,606,596 B1 | * | 8/2003 | Zirngibl et al. ............ | 704/270 |
| 6,615,279 B1 | * | 9/2003 | Robinson .................. | 719/315 |
| 6,621,892 B1 | * | 9/2003 | Banister et al. ........... | 379/88.14 |
| 6,633,630 B1 | * | 10/2003 | Owens et al. ............ | 379/93.24 |
| 6,775,264 B1 | * | 8/2004 | Kurganov .................. | 370/352 |
| 6,801,931 B1 | * | 10/2004 | Ramesh et al. ............ | 709/206 |
| 6,813,489 B1 | * | 11/2004 | Wu et al. ................. | 455/412.1 |
| 6,895,084 B1 | * | 5/2005 | Saylor et al. ............. | 379/88.22 |
| 7,023,970 B1 | * | 4/2006 | Sealey et al. ............. | 379/88.17 |
| 7,124,167 B1 | * | 10/2006 | Bellotti et al. ............. | 709/206 |
| 7,212,614 B1 | * | 5/2007 | Burg et al ................ | 379/88.18 |
| 2002/0013708 A1 | * | 1/2002 | Walker et al. .............. | 704/260 |
| 2002/0076004 A1 | * | 6/2002 | Brockenbrough et al. .. | 379/67.1 |
| 2003/0110211 A1 | * | 6/2003 | Danon ...................... | 709/203 |

\* cited by examiner

*Primary Examiner*—Michael Won
(74) *Attorney, Agent, or Firm*—Maldjian Law Group LLC; John F. Maldjian, Esq.

(57) ABSTRACT

The present invention is a selective announce system for announcing the receipt of electronic mail and instant messages (e-mail). The e-mail has an attached sound file and a predetermined identifier regarding the nature of the sound file. This sound file may be in the sender's voice, a third party's voice, a computer-simulated voice, or some combination. Upon receipt of the e-mail, the sound file is played or used to convert some portion of the e-mail text to voice. The sound file may be played at a recipient computer or it may be played at a recipient's voice mail or it may be played at some other terminal.

38 Claims, 2 Drawing Sheets

METHOD FOR ANNOUNCING E-MAIL AND CONVERTING E-MAIL TEXT TO VOICE

BACKGROUND OF THE INVENTION

Electronic mail, or e-mail, and instant messages (collectively e-mail) have become prevalent in today's society. Their popularity derives mostly from the fact that the days of delay of the typical post office have been replaced with the minimal delay of the electronic post office. Furthermore, e-mail knows no geographical boundaries. People can communicate in writing across the globe almost instantaneously.

However, e-mail has drawbacks. For example, although some e-mail programs alert recipients that new e-mail messages have been downloaded from the e-mail server through the use of sounds, such as a chime, these programs do not inform the recipient of the e-mail's sender or subject, thereby forcing the recipient to look at the computer screen to find such information. This could be time consuming and bothersome if the recipient is involved in some other task. Further, if not logged onto the e-mail server, a recipient of an e-mail message may not know that a certain message is waiting to be download from the e-mail server. As such, hours and perhaps days may pass while the message is left sitting in the mail server queue unread. In business transactions, such a delay could be extremely detrimental. Also, a user may receive information via e-mail but may not have the appropriate equipment to access it immediately. Therefore, he is left with the option of eschewing the e-mail entirely or trying to find a computer or other similar device which will allow him to read the e-mail. As such, it would be advantageous to be able to announce the receipt of e-mails.

SUMMARY OF THE INVENTION

The present invention is a selective announce system for announcing the receipt of electronic mail and instant messages (interchangeably referred to herein as e-mail). The e-mail has an attached sound file and a predetermined identifier regarding the nature of the sound file. This sound file may be in the sender's voice, a third party's voice, a computer-simulated voice, or some combination.

Upon receipt of the e-mail, the sound file is played or used to convert some portion of the e-mail text to voice. The sound file may be played at a recipient computer or it may be played at a recipient's voice mail or it may be played at some other terminal.

The present invention also allows the context of the e-mail to be translated to a voice message by using a voice sample. This voice message may be heard at the recipient's computer or it may be transferred to a recipient's voice mail.

DETAILED DESCRIPTION OF THE INVENTION

The present invention provides an improved electronic mail or instant message (interchangeably referred to herein as e-mail) announce system. The system announces the sender of an e-mail using a sound file. The sound file may be in the sender's voice, a third party's voice, a computer simulated voice, or it may be a combination. The system may also be configured to announce that an e-mail has been received by the e-mail server through the use of Call Screening Messaging and Intercept (CMSI) capable terminals. This option places the recipient on notice that an e-mail message is waiting to be downloaded from the server queue. The system may also have the capability of converting the content of the e-mail to voice using conventional software so that an e-mail can be played as a sound file at the recipient computer or the sound file can be transferred to a voice mail queue. Therefore, recipients of e-mails need not have direct access to a computer terminal to access the e-mail.

In an attempt to communicate via e-mail, a first party (sender) sends an e-mail message to a second party (recipient). At some point, a sound file is attached to the e-mail. The sound file may be attached by the sender's computer or at an adjunct to the sender's computer. It may also be attached by an e-mail server or the recipient computer. The sound file may be a default announcement in a computer simulated voice. The sound file may also be the name of the sender, an announcement in the sender's voice, or some other voice print in the sender's voice. The sound file may also be a combination of a computer simulated voice, or a $3^{rd}$ party voice, and the sender's voice. The sound file can be a .wav file, or it can be any other type of appropriate sound file.

The e-mail may also contain a predetermined identifier detailing the nature of the attached sound file so as to distinguish the sound file from other sound files that may be attached to the e-mail. This predetermined identifier may be a specific file name such as "vsample.wav". It may also be an information tag embedded in the e-mail. The information tag may appear in the e-mail header, or it can appear elsewhere. The information tag may be appended to the e-mail by the sender's computer or by an adjunct to the sender's computer. It may also be appended to the e-mail by an e-mail server or by the recipient computer. The sender may be provided the option to forego the attachment of the sound file. The option may be turned off for all e-mails or turned off for selected recipients, or only turned on for selected recipients.

Figure 1:
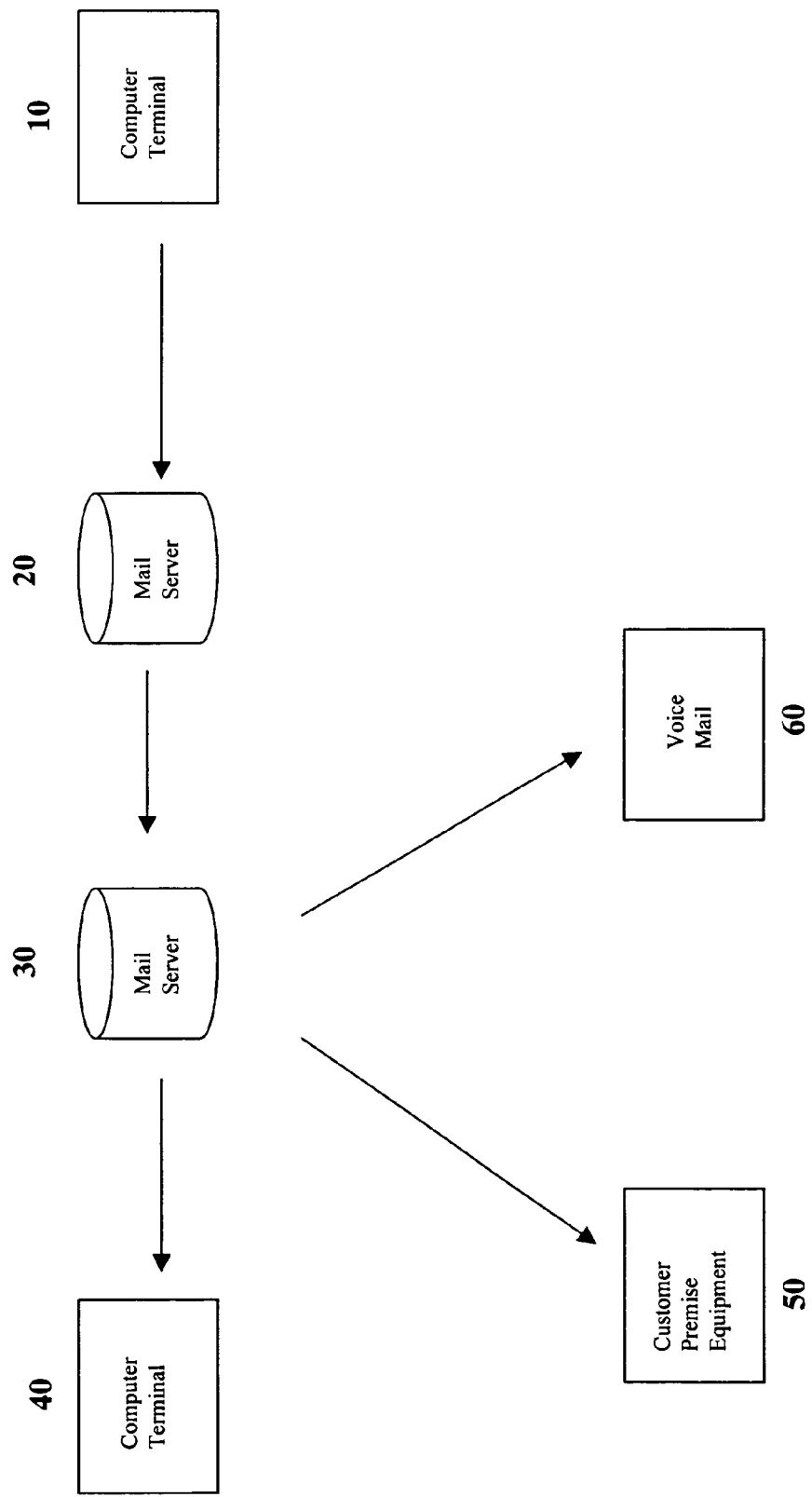
FIG. 1 is a networked computer system consisting of two mail servers.
Figure 2:
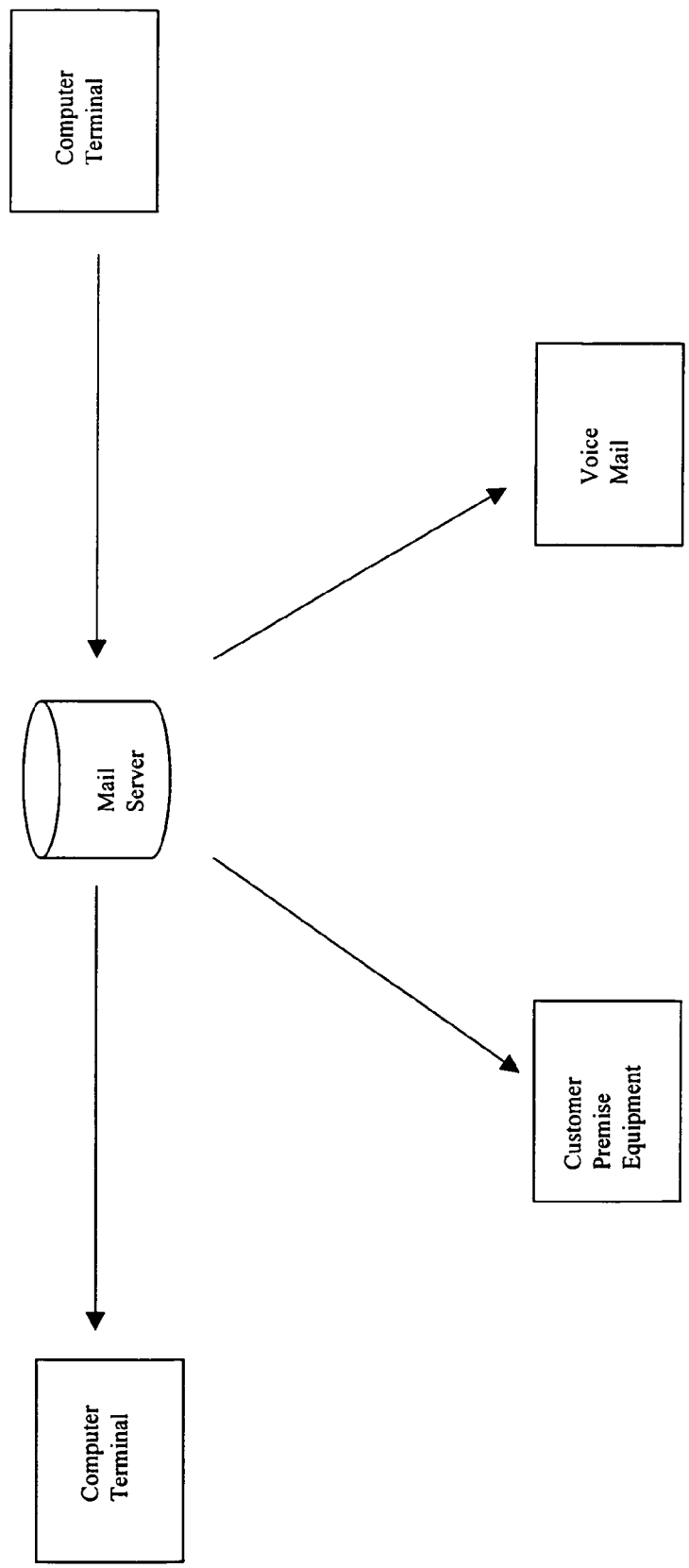
FIG. 2 is a networked computer system consisting of a single mail server.

Regarding FIG. 1, the e-mail message is transmitted from the sender 10 to the sender's mail server 20. The sender's mail server 20 transmits the e-mail to the recipient's mail server 30, or if the sender and recipient have the same mail server (FIG. 2), the e-mail will be transferred to the appropriate queue within the same server. At this point, the recipient's mail server 30 may perform various acts.

The mail server may allow the e-mail to wait in the server queue until the message is downloaded by the recipient 40. Once the message is downloaded, the recipient's computer may note the existence of the e-mail's predetermined identifier, and if the correct feature is present and enabled, the computer automatically opens and plays the sound file. The sound file may be played as a free-standing sound file, or it may be appended to a locally stored sound file. Therefore, the receipt of the e-mail is announced by playing the attached sound file. If the sound file contains the sender's name, it eliminates the need for the recipient to examine the screen to see who sent the new e-mail. If multiple e-mails are received, the computer may play each sound file in order of receipt or in some other appropriate order. The recipient may be provided with the option to forego the automatic execution of the sound file. The option may be turned off for all e-mails, or turned off for certain e-mails, or only turned on for selected e-mails.

The mail server may also forward the sound file by itself without the accompanying e-mail to the recipient computer. If the recipient's computer has the correct feature present and enabled, the sound file would be played by the recipient computer, either by itself or in conjunction with some other sound file. The recipient would then realize that an e-mail message from a certain sender was sitting in the mail server queue. The recipient may then download the e-mail message in its entirety from the mail server using their computer terminal or some other appropriate terminal.

The e-mail sound file could also be used in conjunction with a Call Screening Messaging and Intercept (CMSI) feature on a Customer Premise Equipment (CPE). The mail server could contact the recipient by ringing the recipient's CPE 50. If the CPE 50 is CMSI compatible, the mail server could use the CMSI feature to play the sound file for the intended recipient via their CPE. As such, the recipient would be informed that there is an e-mail waiting in the server queue to be downloaded. The recipient could then use a computer terminal, or some other appropriate terminal, to log into their e-mail server and download the e-mail.

The mail server could also be configured to interact with the recipient's voice mail system. Upon receiving an e-mail message, the mail server could contact the recipient's voice mail system 60 and leave the attached sound file as a message in the voice-mail. The next time the recipient checked his voice-mail 60, he would be informed that there is an e-mail waiting in the e-mail server queue to be downloaded. The recipient could then use their computer terminal, or some other appropriate terminal, to log into their e-mail server and download the e-mail.

The mail server could be programmed so that it contacts the recipient's CPE 50 or the recipient's voice mail 60 each time a new e-mail is queued or each time a group of new e-mail is queued by the mail server. The mail server may also be programmed to contact the recipient's CPE 50 or the recipient's voice mail 60 based on whether or not the e-mail received at the server matches a criteria on a preference list. Such criteria may include the names of specific senders, specific subjects, specific dates, etc. The recipient can transmit such a preference list to the mail server in several ways, including but not limited to letter, e-mail, a Web Page, or telephone.

In addition to the above, the content of the e-mail may be converted from text to voice. Upon receipt of the sender's e-mail, the attached sound file could be used as a voice sample to convert the e-mail text to voice. For better accuracy, a locally stored voice sample of greater length could be used to convert the content of the e-mail to voice. This conversion may be performed by the mail server or by the recipient's computer using conventional software. It may also be performed by an adjunct to the recipient's computer. The new voice message could then be played at the recipient's computer or it could be transferred to the recipient's voice mail. The e-mail message itself could be deleted from the server queue once it has been converted, or it can be left in the queue for later download.

The mail server could be programmed so that it converts all e-mail messages to voice messages and subsequently transfers them to the recipient's voice mail. The mail server can also be programmed so that the conversion from e-mail to voice mail only occurs when an e-mail matches a preference list. Such preferences may include a specific sender, specific subject or specific date. This preference list could be the same preference list as the one for e-mail announcements or it can be a different one. The recipient can transmit such a preference list to the mail server in several ways including but not limited to letter, Web Page, or telephone.

Using the above technology, it may be possible for the recipient to access his e-mail through a voice mail system. While accessing his voice mail system, a recipient may select a feature in which the voice mail system interacts with the e-mail server. The attached sound files of each e-mail or each e-mail matching certain preferences in the mail server queue would be played for the recipient. After hearing the sound file for an e-mail, the recipient could be given the option of having the content of that e-mail converted to a voice message. If the recipient selects this option, the mail server could utilize conventional software and the sender's voice sample to convert the content of the e-mail from text to speech. Once translated, it would be played for the recipient.

It is to be understood that the following claims are intended to cover all of the generic and specific features of the invention as described herein, and all statements of the scope of the invention which, as a matter of language, might be said to fall there between.

Having described the invention, what is claimed is:

1. An electronic message configured to be communicated between a sender's device and a recipient's device, the electronic message comprising:
    an attached sound file; and
    an attached predetermined identifier associated with the sound file, the predetermined identifier comprising:
        a distinguishing indication configured to distinguish the sound file from other files attached to the electronic message; and
        a course of action indication configured to indicate a course of action to be taken by the recipient's device with the sound file, the course of action indication comprising an information tag;
    wherein based on the course of action indicated by the predetermined identifier, the recipient's device is configured to selectively convert a content of the electronic message from text to voice using at least one of the sound file and a locally stored voice sample; and
    wherein the recipient's device is configured to selectively play at least one of the sound file and the converted content of the electronic message.

2. The method of claim 1 wherein said sound file contains at least one word in a sender's voice.

3. The method of claim 1 wherein said sound file contains at least one word in a computer simulated voice.

4. The method of claim 1 wherein said sound file contains at least one word in a computer simulated voice and at least one word in a sender's voice.

5. The method of claim 1 wherein the information tag is embedded in a header of the electronic message.

6. A method for sending an electronic message from a sender's device to a recipient's device, the method comprising the steps of:
    attaching a sound file to the electronic message;
    associating a predetermined identifier with the sound file and attaching the predetermined identifier to the electronic message, the predetermined identifier comprising:
        a distinguishing indication configured to distinguish the sound file from other files attached to the electronic message; and
        a course of action indication configured to indicate a course of action to be taken by the recipient's device with the sound file, the course of action indication comprising an information tag;
    based on the course of action indicated by the predetermined identifier, selectively converting a content of the electronic message from text to voice using at least one of the sound file and a locally stored voice sample; and
    selectively playing at least one of the sound file and the converted content of the electronic message.

7. The method of claim 6 wherein said attaching is performed by the sender's device.

8. The method of claim 6 wherein said attaching is automatic.

9. The method of claim 6 wherein said attaching is performed by an adjunct to the sender's device.

10. The method of claim 6 wherein said attaching is performed by an e-mail server.

11. The method of claim 6 further comprising:
transmitting the electronic message to the recipient's device, wherein the attaching is performed by the recipient's device.

12. The method of claim 6 wherein said sound file contains at least one word in a sender's voice.

13. The method of claim 12 wherein said sound file further contains at least one word in a computer simulated voice.

14. The method of claim 6 wherein said sound file contains at least one word in a computer simulated voice.

15. The method of claim 6 wherein the information tag is embedded in a header of the electronic message.

16. The method of claim 15 wherein the information tag is embedded by the sender's device.

17. The method of claim 15 wherein the information tag is embedded by an adjunct to the sender's device.

18. The method of claim 15 wherein the information tag is embedded by an e-mail server.

19. The method of claim 15 wherein the information tag is embedded by the recipient's device.

20. The method of claim 15 where said attaching is selectively performed by a sending party.

21. A method for announcing electronic messages, the method comprising the steps of:
receiving an electronic message with an attached sound file;
noting the presence of a predetermined identifier attached to the electronic message, wherein the predetermined identifier comprises:
a distinguishing indication configured to distinguish the sound file from other files attached to the electronic message; and
a course of action indication configured to indicate a course of action to be taken with the sound file, the course of action indication comprising an information tag;
based on a course of action indicated by predetermined identifier, selectively converting a content of the electronic message from text to voice using at least one of the sound file and a locally stored voice sample; and
selectively playing at least one of the sound file and said converted content of the electronic message in response to the noting of the predetermined identifier.

22. The method of claim 21 further comprising receiving at least one more electronic message with an attached sound file and playing said at least one more sound file.

23. The method of claim 21 wherein said sound file contains at least one word in a sender's voice.

24. The method of claim 21 wherein said sound file contains at least one word in a computer simulated voice.

25. The method of claim 21 wherein said sound file contains at least one word in a computer simulated voice and at least one word in a sender's voice.

26. The method of claim 21 wherein the information tag regarding the sound file is embedded in a header of the electronic message.

27. The method of claim 26 wherein the information tag is embedded by a sender computer.

28. The method of claim 26 wherein the information tag is embedded by an adjunct to a computer at a sending party's end.

29. The method of claim 26 wherein the information tag is embedded by an e-mail server.

30. The method of claim 26 wherein the information tag is embedded by a recipient computer.

31. The method of claim 21 where said playing is performed at a recipient computer.

32. The method of claim 21 where said playing is performed at a recipient customer premise equipment.

33. The method of claim 21 where said playing is performed at a recipient voice mail.

34. The method of claim 21 where said converting is performed at an e-mail server.

35. The method of claim 21 where said converting is performed at a recipient computer.

36. The method of claim 21 where said converting is performed at an adjunct to a computer at the receiving party's end.

37. The method of claim 21 where said converting is performed at a voice messaging system.

38. The method of claim 21 further comprising transferring said voice message to a voice-mail box.

* * * * *